US006627749B1

(12) United States Patent
Kumar

(10) Patent No.: US 6,627,749 B1
(45) Date of Patent: Sep. 30, 2003

(54) POWDERED OXIDIZED CELLULOSE

(75) Inventor: Vijay Kumar, Coralville, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/711,359

(22) Filed: Nov. 9, 2000

Related U.S. Application Data

(60) Provisional application No. 60/165,305, filed on Nov. 12, 1999.

(51) Int. Cl.[7] .............................................. C08B 15/00
(52) U.S. Cl. ........................ 536/56; 536/30; 536/123.1; 536/124
(58) Field of Search ........................ 536/30, 56, 123.1, 536/124

(56) References Cited

U.S. PATENT DOCUMENTS

| 3,364,200 A | * | 1/1968 | Ashton ........................ 260/212 |
| 3,720,660 A | * | 3/1973 | Arendt ........................ 260/12 |
| 5,134,229 A | * | 7/1992 | Saferstein ..................... 536/56 |
| 5,484,913 A | * | 1/1996 | Stilwell ....................... 536/57 |
| 5,747,058 A | * | 5/1998 | Tipton ........................ 424/423 |
| 5,968,542 A | * | 10/1999 | Tipton ........................ 424/423 |
| 6,007,845 A | * | 12/1999 | Domb ......................... 424/501 |

FOREIGN PATENT DOCUMENTS

| CS | 221227 | * | 4/1983 | |
| EP | 0815881 | * | 7/1998 | ........... A61L/31/00 |
| GB | 2314842 | * | 6/1996 | ........... A61L/15/32 |

OTHER PUBLICATIONS

P.N. Galgut, Peridontal Clinical Investigations, vol. 18, No. 1, 1996, 22–25.*

* cited by examiner

*Primary Examiner*—James O. Wilson
*Assistant Examiner*—Ganapathy Krishnan
(74) *Attorney, Agent, or Firm*—McKee, Voorhees & Sease, P.L.C.

(57) ABSTRACT

A controlled chemical method to produce oxidized cellulose in high yields (75–95%) and different levels of oxidation (carboxyl content <25.6%, w/w), suitable for use as an immobilizing matrix or carrier for drugs, chemicals, and biological macromolecules, has been developed by reacting a cellulose material with a mixture of phosphoric acid and nitric acid and a small but adequate amounts of sodium nitrite at room temperature for a period until the desired oxidation level is obtained.

21 Claims, 10 Drawing Sheets

POWDERED OXIDIZED CELLULOSE

PRIORITY CLAIM

This application claims priority to U.S. Provisional Application Ser. No. 60/165,305 filed Nov. 12, 1999.

FIELD OF THE INVENTION

This invention relates to the manufacture of powdered/microfibrillated oxidized cellulose suitable for use as an immobilizing matrix or a carrier for drugs, chemicals, and biological macromolecules having applications in the pharmaceutical, medical, veterinary, and agricultural fields. Specifically, this invention relates to a method and means of producing oxidized cellulose in high yields and with different levels of oxidation involving a treatment of a cellulose source with a mixture of phosphoric acid and nitric acid and sodium nitrite.

BACKGROUND OF THE INVENTION

Oxidized cellulose (OC) containing less than 3% carboxylic content is useful as a direct compression tabletting excipient and as a drug carrier and a bodying agent in the development of topical and transdermal formulations (see Banker and Kumar, U.S. Pat. Nos. 5,414,079 and 5,405,953), whereas OC with ≧3% carboxylic groups serves as a biodegradable material (see Ashton, U.S. Pat. No. 3,364,200). OC containing 16–24% carboxylic content has been accepted for use in humans to stop bleeding during surgery and to prevent the formation and reformation of post surgical adhesions (1). Studies also show that OC possesses antibacterial activity (2), promotes bone regeneration (3), and is useful in periodontal therapy (4). These properties have been related to the polyglucuronic acid structure of OC.

The carboxyl content and degree of polymerization (DP) of oxidized cellulose have been reported to play important roles in the degradation of oxidized cellulose in-vitro and in-vivo. In general, the higher the carboxyl content, or the lower the DP, the faster the degradation of OC (5). In-vitro solubilization and degradation studies have shown OC to be readily hydrated. About 90% of OC (carboxyl content 12–18%) converts to solubilized substances within 21 days in a pH 7.4 buffer solution. An analysis of the resulting OC solution by high performance liquid chromatography (HPLC) suggested that the polymer readily undergoes chain shortening to yield oligomers (6). In the presence of plasma or serum, the oligomers are further hydrolyzed to small fragments, such as glucose, glucuoronic acid and 2,3-carbon fragments. It has been suggested that the degradation of OC to oligomers occurs due to the presence of the carboxyl group at the C-6 position, which increases the susceptibility of the intersaccharide linkage to hydrolytic cleavage. Dimitrijevzh et al. (7) studied the degradation of the OC (carboxyl content 12–18%) in-vivo. They implanted oxidized cellulose onto rabbit uterine horn abrasions. Degradation was found to be rapid, and the oligomeric products produced were present primarily in the peritoneal fluid at the implantation site. No accumulation was observed in either the serum or urine. A mechanism of degradation consisting of chemical depolymerization, followed by enzymatic hydrolysis mediated by glycosidases endogenous to peritoneal macrophages, was proposed in this study.

Several studies on the use of OC as an immobilization matrix for drugs, and enzymes have been reported (9–20). Dol'berg et al. (9) reported the preparation, characterization and evaluation of ionic complexes of kanamycin sulfate and sulfanilamide with oxidized cellulose fiber. Compared to free drugs, these complexes exhibited biological effects in excess of twenty days, and were readily absorbed in-viuo. Adrenalone complexed with oxidized cellulose showed prolonged antiseptic and anesthetic activities and was useful for treating parodontosis (12,13). Firsov et al. (15) found that the ionic complexes of lincomycin and OC were less irritating to the skin and mucous membranes. Implants of an ionic complex of gentamycin and OC showed antibiotic concentrations at the site of implantation for 30 days (15). Recently, several chemotherapeutic agents, such as photrin (16), dimetpramide (17), and a mixture of methotrexate and hydroxythiamine (18), have been immobilized on OC and were shown to be more effective than the respective free drugs. When trypsin was immobilized on OC, it exhibited higher activity than when it was immobilized on phosphate or amino functionalized cellulose (19). Increased activity was also observed when proteinase, an enzyme, was immobilized on OC (20).

Currently, oxidized cellulose containing 16–24% carboxylic content is commercially available in powder, gauze and fabric forms. However, it is relatively expensive to be used as an excipient in the development of a pharmaceutical product. The existing methods to produce OC typically involve a reaction between cellulose and an oxidant. The latter includes nitrogen dioxide or dinitrogen tetraoxide, dichromate/dinitrogen tetraoxide, nitric acid, nitric acid-sodium nitrite, sulfuric acid-nitric acid-sodium nitrite, phosphoric acid-sodium nitrite, phosphoric acid-sodium nitrite-sodium nitrate, and phosphoric acid nitrogen dioxide, hypohalites, sodium persulfate, etc. (21). Oxidants that produce OC with less than 3% carboxylic content have been disclosed in U.S. Pat. Nos. 5,414,079 and 5,405,953. They are non-specific in their mode of action and often introduce aldehyde and/or ketone groups in addition to the carboxylic groups.

The primary consideration in the preparation of biodegradable oxidized cellulose having 3% or higher carboxylic groups is the uniformity and extent of oxidation. Of the various oxidizing agents investigated, nitrogen dioxide has been the most extensively studied for cellulose. It selectively converts the C-6 primary hydroxyl group to the carboxyl group. Nitrogen dioxide can be used in the gaseous form or as a solution in an appropriate organic solvent.

French patent 2,408,624 (22) and Netherlands patent 7,711,034 (23) disclose the preparation of oxidized cellulose materials suitable for use as a homeostatic agent, by treatment of cotton gauze with a $HNO_3$—$NaNO_2$ mixture for 24 hours. The product contained 14–18% carboxyl group, and reportedly dissolved in 0.1 M NaOH.

In U.S. Pat. No. 2,758,112 (24), a mixture of $H_2SO_4$—$HNO_3$—$NaNO_2$ was used to prepare OC from cellulose fibers. This product contained about 16% carboxyl content. Compared to the $NHO_3$—$NaNO_2$ method, this process requires a much shorter reaction time and is more cost effective. The present inventor has found, however, that the yield of OC by this method is very low (~20%).

Walimbe et al. (25) reported a two-stage oxidation process to produce OC, first using an acid-dichromate mixture and then with nitrogen dioxide as oxidants. The main advantage of this method is that the reaction period of vapor phase oxidation with $NO_2$ is reduced considerably. This method allows the manufacture of OC with 6–18% carboxylic content. However, the reaction conditions are difficult to control. Further, this method introduces chromium, which is objectionable.

Recently, Heinze et al. (26) investigated the oxidation of cellulose under homogeneous conditions by dissolving the starting cellulose in $H_3PO_4$ and then oxidizing with $N_2O_3$, produced in situ following addition of the $NaNO_2$. Using this approach, they were able to produce OC with an 80% yield and with up to a 21% carboxyl content. However, the initial dissolution step is slow at room temperature and requires a long reaction period. Reportedly, heating the solution to a higher temperature facilitates the dissolution of cellulose but also causes a rapid hydrolysis of cellulose (Wei and Banker, U.S. Pat. No. 5,417,984).

The role of phosphoric acid in the oxidation of cellulose was also studied by Bertocchi et al. (27). They swelled cellulose in 85% $H_3PO_4$ for 0–5 hours at 4° C. prior to treatment with $NO_2$ gas. The pretreatment of cellulose with $H_3PO_4$ produced a good yield and an acceptable oxidation level of OC. However, the DP was too high (~900) because the phosphoric acid is a relatively weak acid. This limits its use in pharmaceutical application. More recently, Gert et al. (28) prepared OC in a powder form by treating cellulose with $NHO_3$ at elevated temperatures (50–100° C.). Both oxidation and hydrolysis (degradation) of cellulose have been reported to occur simultaneously under these conditions.

From the discussion above, it is obvious that there is a need in the art for a method of producing OC in different oxidation levels and high yields. There is also a need in the art for a method of producing finally powdered/microfibrillated, colloidal or microsphere forms of OC so that pharmaceutical applications of OC may be possible.

Accordingly, it is a primary objective of the present invention to provide a method and means of producing oxidized cellulose in high yields and different oxidation levels.

It is a further objective of the present invention to provide a method and means of producing oxidized cellulose suitable for use as a biodegradable carrier or immobilizing matrix for a variety of drugs, proteins, and enzymes.

It is still a further objective of the present invention to provide a method and means of producing oxidized cellulose using a variety of cellulose sources, including cotton linters, purified cotton papers, a-cellulose, purified wood pulp, microcrystalline cellulose, powdered cellulose, or like materials.

It is a further objective of the present invention to provide a method and means of producing oxidized cellulose that is suitable for the manufacture of sustained- and/or controlled release delivery systems for drugs and other chemical agents.

It is still a further objective of the present invention to provide a method and means of producing oxidized cellulose that is suitable for use in stopping bleeding during surgery.

It is yet a further objective of the present invention to provide a method and means of producing oxidized cellulose that is suitable for use in preventing the formation and reformation of surgical adhesions.

It is a further objective of the present invention to provide a method and means of producing oxidized cellulose that is suitable for promoting bone regeneration.

It is a further objective of the present invention to provide a method and means of producing oxidized cellulose that is suitable for use in periodontal therapy.

Yet a further objective of the present invention is to provide a method and means of producing oxidized cellulose that is economical.

The method and means of accomplishing each of the above objectives as well as others will become apparent from the detailed description of the invention which follows hereafter.

SUMMARY OF THE INVENTION

The present invention provides a new method of preparing oxidized cellulose with different levels of oxidation and in high yields, suitable for use in pharmaceutical products as a carrier for a variety of drugs, proteins, and enzymes. Oxidized cellulose with less than 3% carboxylic content serves as a non-degradable carrier system, whereas that containing equal to or greater than 3% carboxylic groups is useful as a biodegradable drug carrier. The method involves treatment of a cellulose source with a mixture of phosphoric acid and nitric acid and a small but adequate amount of sodium nitrite at room temperature for a period until the desired level of oxidation is achieved. The present invention also provides a method whereby cellulose materials such as cotton linters, purified cotton papers, α-cellulose, purified wood pulp, microcrystalline cellulose, powdered cellulose, or like materials can be readily oxidized to produce products that can be used to develop a sustained- and/or controlled release delivery systems for drugs and other chemical agents. The oxidized cellulose of this invention is also suitable to stop bleeding during surgery, prevent the formation and reformation of post surgical adhesions, promote bone regeneration, and for use in periodontal therapy.

DETAILED DESCRIPTION OF THE INVENTION

Figure 1:
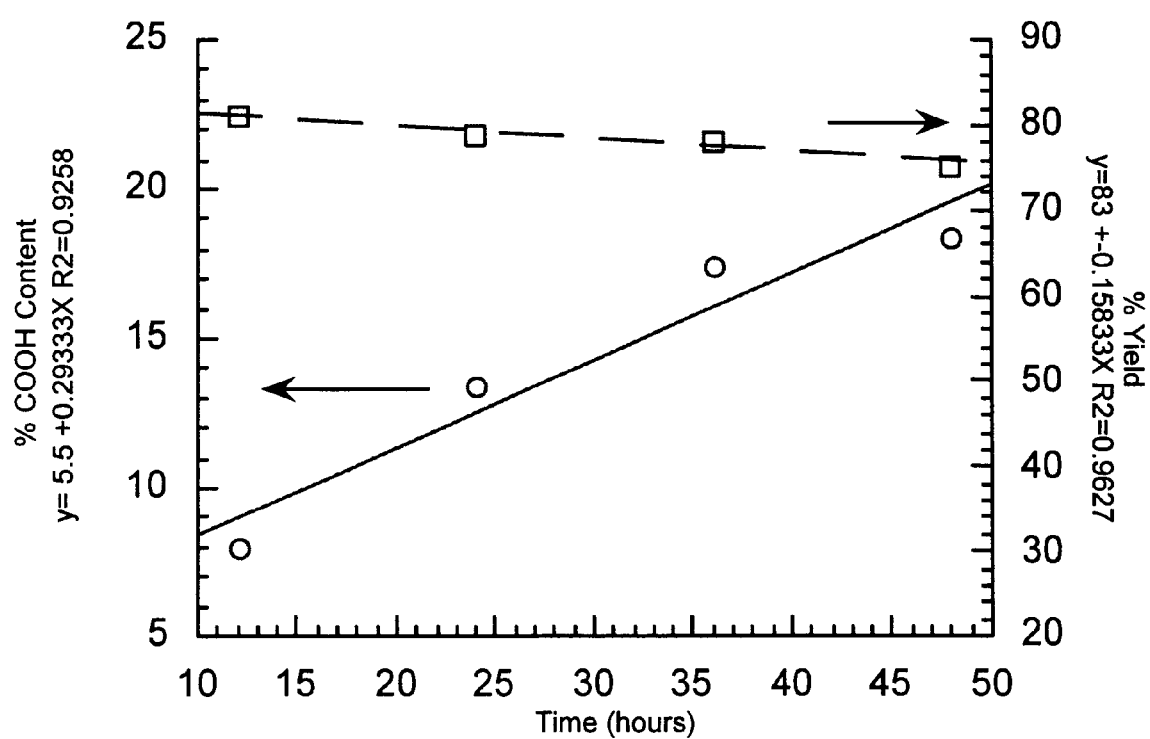
FIG. 1 shows the effect of reaction time on the oxidation and yields of oxidized cellulose.

According to the invention, oxidized cellulose powders/microfibers in high yields and with different amounts of carboxylic content can be prepared by reacting a cellulose source, preferably cotton linter in sheet or pulp form or powdered cellulose prepared from cotton linter by chemical or mechanical disintegration, with a mixture of phosphoric acid and nitric acid and an amount of sodium nitrite sufficient to oxidize the cellulose. The cellulose/acid-sodium nitrite mixture is reacted at room temperature for a time period that produces the desired carboxylic content.

Compared to sulfuric acid, disclosed in U.S. Pat. No. 2,758,112, the use of phosphoric acid in the reaction is advantageous. Phosphoric acid decrystallizes cellulose, and hence facilitates entry of the oxidant to the reaction sites. Further, the hydrolysis reaction by phosphoric acid is slow (31), thereby allowing for controlled preparation of low crystallinity oxidized cellulose with different level-off DP values.

The preferred starting cellulose materials for use in this invention are cotton linter in sheet or pulp form and cellulose powders prepared by either mechanical or chemical disintegration of alpha-cellulose, hard or soft wood pulp, purified wood pulp, cotton linter sheet, cotton pulp, or the like. Other sources of cellulose include low crystallinity celluloses and commercially available cellulose excipients, such as microfibrillated cellulose, powdered cellulose, regenerated cellulose, and microcrystalline cellulose.

The starting cellulose material is then soaked in an acid mixture consisting of phosphoric acid, nitric acid, and sodium nitrite for a time period and in concentrations sufficient to oxidize the cellulose to the desired level. The acids may be utilized in their concentrated forms that are supplied commercially. Phosphoric acid is typically supplied as 85% w/v, while nitric acid is 61–71% w/v.

The volume of acid mixture should be chosen such so that it completely soaks the starting cellulose source. Typically, a 1:>5 weight-to-volume (w/v)ratio of cellulose to acid mixture is preferred for the powdered cellulose starting material, while for cotton linter sheet/pulp or like materials, the preferred weight-to-volume ration of phosphoric acid and nitric acid is 1:12–15. The composition of the acid mixture (i.e., $H_3PO_4$ and $HNO_3$) may vary between 0.1:9.9 and 9.9:0.1 (v/v), preferably between 4:1 and 1:4 (v/v). The amount of sodium nitrite added to the cellulose-acid mixture may range between 0.1% and 3%, preferably from 0.5 to 1.5% w/v, with respect to the volume of acid mixture.

The cellulose source must be completely soaked in the acid mixture prior to addition of the sodium nitrite. The sodium nitrite can be added in portions or all at once. The addition of sodium nitrite to the acid mixture results in an immediate generation of dense brown fumes. The release of these brown fumes into the air is preferably minimized, for instance by covering the container in which the reaction occurs. As the reaction progresses, the reaction mixture shows some brown, to greenish-blue coloration and develops foam. Once this occurs, the reaction mixture is preferably occasionally agitated in order to prevent foam formation and facilitate the breaking up of cellulose fibers.

After a predetermined period of time, the reaction may be terminated by adding an excess of water, preferably 10 times the volume of the acid solution used in the reaction. Specifically, the reaction should be allowed to proceed until the cellulose has achieved the desired oxidation level. In general, this reaction time may vary between 0.5 and 60 hours, with about 6–48 hours being preferred. The reaction temperature may generally range between 5 and 35° C., preferably between 15° C. and ambient temperature (24–28° C.).

Once the reaction is terminated, the reaction mixture is filtered, and the residue is washed, first with water, until the filtrate shows a pH of 5–7, and then with acetone or other water-miscible organic solvent. The white to off-white residue can then be air or vacuum dried to produce the final oxidized cellulose product. The resultant product is either a free flowing powder or a fluffy fibrous material depending on whether the starting cellulose used is mechanically or chemically disintegrated powdered cellulose or cotton linter sheet/pulp, respectively. The fluffy-fibrous material can be readily converted into a fine powder (microfibers) or loosely-packed spherical aggregates by grinding using a pestle and mortar or in a ball mill or any other conventional laboratory grinder.

The oxidized celluloses of this invention are relatively low crystallinity materials. As a general rule, the carboxylic content of the oxidized cellulose linearly increases with increasing reaction time, whereas the product yields remain unchanged. When cotton linter sheet is used as the starting cellulose source, the fiber length of the product decreases with increasing reaction time. When ball-milled, the long fibrous structures of the product turn into smaller fibers, to loosely-packed spherical aggregates. No significant change in the crystallinity of these samples occurs as a result of ball milling.

The degradable oxidized celluloses (i.e., containing $\geq 3\%$ carboxylic content) of this invention can be readily converted into a stable aqueous dispersion by first dissolving in an alkali or ammonical solution and then titrating back with an acid to a desired pH. The solution will generally be titrated to a pH ranging from about 1.0–3.5. The free inorganic salts in the dispersion can be removed by dialysis. The resulting salt-free dispersion of oxidized cellulose serves as an immobilizing matrix for a variety of amine drugs and biological macromolecules (e.g., proteins and enzymes). Aqueous dispersions/suspension of oxidized cellulose containing less than 3% carboxylic groups are prepared by subjecting the oxidized cellulose to high shear mixing in water. Optionally, a suspending agent or viscosity enhancing agent is added to the dispersion to improve its physical stability.

Oxidized cellulose microparticles/microspheres containing drugs can also be prepared using such aqueous dispersions by either spray drying or conventional emulsification, followed by heating at a temperature sufficient to remove water, methods. A variety of plasticizers, preferably a hydrophilic plasticizer such as glycerin, polyethylene glycols, propylene glycol, etc., can also be used with the dispersion. The use of a small but adequate amount of plasticizer reduces the interaction forces between polymer chains and as a result facilitates coalescence between boundaries of particles and consequently produces microspheres with smooth surface. The general procedures for preparing microspheres are well known to those skilled in the art.

Adequately plasticized aqueous dispersions/suspensions of degradable oxidized cellulose are also useful in coating tablets and the like dosage forms. Such coatings slowly dissolve in alkaline solutions and biological fluids (pH 7.4) due to ionization of the carboxyl groups. Other commonly used film forming polymers can be mixed with such dispersions and used.

Aqueous dispersions of non-degradable oxidized cellulose (i.e., oxidized cellulose with less than 3% carboxylic content), can be mixed with a variety of agents, including neutral or anionic polymers, drugs, surfactants, wax, etc., and used in the development of pharmaceuticals that can be administered orally, topically, transdermally, intravenously, subcutaneously, etc. oral. With respect to topical and transdermal products, as noted above, the presence of a plasticizer decreases polymer-polymer chain interactions, thereby reducing the rigidity of the chains, hence promoting polymer coalescence and film formation. The incorporation of a plasticizer is important as it allows the preparation of a monolithic film.

The formulation of pharmaceutically-acceptable dosage forms is well known in the art. As used herein, the term "pharmaceutically-acceptable" refers to the fact that the preparation is compatible with the other ingredients of the formulation and is safe for administration to animals.

As noted above, oxidized cellulose having less than 3% carboxylic content can be used to prepare semi-solid topical formulations. Generally, topical preparations may comprise auxiliaries such as preservatives, bactericides, perfumes, substances for preventing foaming, dyes, pigments which have a coloring action, thickeners, surface-active substances, emulsifiers, softening, humidifying and/or humectant substances, fats, oils, and waxes. Other customary constituents of cosmetic and/or dermatological formulations include alcohols, polyols, polymers, foam stabilizers, electrolytes, organic solvents, and silicone derivatives.

If the formulation is a lotion, appropriate solvents that may be used are:

1) water or aqueous solutions; 2) oil, such as triglycerides of capric or caprylic acid; 3) fats, waxes and other naturally occurring and synthetic fat substances, preferably esters of fatty acids with alcohols of low C number, for example isopropanol, propylene glycol or glycerol, or esters of fatty alcohols with alkanoic acids of low C number or with fatty acids; 4) alcohols, diols, or polyols of low C number, and ethers thereof, preferably ethanol, isopropanol, propylene glycol, glycerol, ethylene glycol, ethylene glycol monoethyl, monoethyl or monobutyl ether, propylene glycol monomethyl, monoethyl or monobutyl ether, diethylene glycol monomethyl or monoethyl ether and analogous products. Mixtures of these solvents may also be used. Water can be a further constituent of alcoholic solvents.

Emulsions according to the invention may include, for example, the fats, oils, waxes, and other fatty substances set forth above, as well as water.

Ointments are generally water in oil preparations which may include hydrocarbon bases, such as petrolatum, and other oleaginous bases such as lard, benzoinated lard, olive oil, cottonseed oil, gelled mineral oil, and other oils.

Gels according to the invention usually comprise alcohols of low C number, for example ethanol, isopropanol, 1,2-propanediol, glycerol and water, or the above-mentioned oils in the presence of a thickener, which may be silicon dioxide or an aluminum silicate in oily-alcoholic gels and is preferably a polyacrylate in aqueous-alcoholic or alcoholic gels.

Solid sticks according to the invention may comprise, for example, naturally occurring or synthetic waxes, fatty alcohols or fatty acid esters.

Topical formulations which include the oxidized cellulose of this invention may further include a variety of substances, including suitable stabilizers, and wetting agents as well as colorings, moisturizers, preservatives, and fragrances. These minors are added in small amounts and are conventionally known in pharmaceutical formulation work to enhance elegance. Such minors should comprise less than 1% of the overall composition. Topical formulations of this invention will generally include from about 0.5–25% by weight of the oxidized cellulose, with about 2–10% by weight being preferred.

The preparation methods of topical and transdermal products are also well known to persons skilled in the art. Any types of drugs may be added to the pharmaceutical preparations of this invention, so long as they are compatible with the other ingredients of the preparations.

Oral dosage forms encompass tablets, capsules, granules, and dragees. Preparations which can be administered rectally include suppositories. Other dosage forms include suitable solutions for administration parenterally or orally, and compositions which can be administered buccally or sublingually.

The pharmaceutical preparations of the present invention are manufactured in a manner which is itself well known in the art. For example the pharmaceutical preparations may be made by means of conventional mixing, granulating, dragee-making, dissolving, lyophilizing processes. The processes to be used will depend ultimately on the physical properties of the active ingredient used.

Suitable excipients are, in particular, fillers such as sugars for example, lactose or sucrose mannitol or sorbitol, cellulose preparations and/or calcium phosphates, for example, tricalcium phosphate or calcium hydrogen phosphate, as well as binders such as starch, paste, using, for example, maize starch, wheat starch, rice starch, potato starch, gelatin, gum tragacanth, methyl cellulose, hydroxypropylmethylcellulose, sodium carboxymethylcellulose, and/or polyvinyl pyrrolidone. If desired, disintegrating agents may be added, such as the above-mentioned starches as well as carboxymethyl starch, cross-linked polyvinyl pyrrolidone, agar, or alginic acid or a salt thereof, such as sodium alginate. Auxiliaries are flow-regulating agents and lubricants, for example, such as silica, talc, stearic acid or salts thereof, such as magnesium stearate or calcium stearate and/or polyethylene glycol. Dragee cores may be provided with suitable coatings which, if desired, may be resistant to gastric juices.

For this purpose concentrated sugar solutions may be used, which may optionally contain gum arabic, talc, polyvinylpyrrolidone, polyethylene glycol and/or titanium dioxide, lacquer solutions and suitable organic solvents or solvent mixtures. In order to produce coatings resistant to gastric juices, solutions of suitable cellulose preparations such as acetylcellulose phthalate or hydroxypropylmethylcellulose phthalate, dyestuffs and pigments may be added to the tablet of dragee coatings, for example, for identification or in order to characterize different combination of compound doses.

Other pharmaceutical preparations which can be used orally include push-fit capsules made of gelatin, as well as soft, sealed capsules made of gelatin and a plasticizer such as glycerol or sorbitol. The push-fit capsules can contain the active compounds in the form of granules which may be mixed with fillers such as lactose, binders such as starches, and/or lubricants such as talc or magnesium stearate and, optionally, stabilizers. In soft capsules, the active compounds are preferably dissolved or suspended in suitable liquids, such as fatty oils, liquid paraffin, or liquid polyethylene glycols. In addition stabilizers may be added. Possible pharmaceutical preparations which can be used rectally include, for example, suppositories, which consist of a combination of the active compounds with the suppository base. Suitable suppository bases are, for example, natural or synthetic triglycerides, paraffinhydrocarbons, polyethylene glycols, or higher alkanols. In addition, it is also possible to use gelatin rectal capsules which consist of a combination of the active compounds with a base. Possible base material include for example liquid triglycerides, polyethylene glycols, or paraffin hydrocarbons.

Suitable formulations for parenteral administration include aqueous solutions of active compounds in water-soluble or water-dispersible form. In addition, suspensions of the active compounds as appropriate oily injection suspensions may be administered. Suitable lipophilic solvents or vehicles include fatty oils for example, sesame oil, or synthetic fatty acid esters, for example, ethyl oleate or triglycerides. Aqueous injection suspensions may contain substances which increase the viscosity of the suspension, including for example, sodium carboxymethyl cellulose, sorbitol and/or dextran. Such compositions may also comprise adjuvants such as preserving, wetting, emulsifying, and dispensing agents. They may also be sterilized, for example, by filtration through a bacteria-retaining filter, or by incorporating sterilizing agents into the compositions. They can also be manufactured in the form of sterile solid compositions which can be dissolved or suspended in sterile water, saline, or other injectable medium prior to administration.

In addition to administration with conventional carriers, active ingredients may be administered by a variety of specialized delivery drug techniques which are known to those of skill in the art, such as portable infusion pumps.

Oxidized celluloses made in accordance with this invention may be used in the same manner as conventional oxidized celluloses which contain carboxylic groups. For instance, as biodegradable polymers, oxidized celluloses with 16–24% carboxylic content have been approved for use in stopping bleeding during surgery, preventing the formation and reformation of post surgical adhesions, and promoting bone regeneration.

The control of bleeding is a serious problem in certain surgical procedures and in various types of emergency wounds. Oxidized celluloses are absorbable hemostats that provide the advantage over conventional gauze pads and similar articles in that they may be placed in and left in place in a closed wound without causing tissue reaction or irritation, making removal unnecessary. The cellulose may be applied directly to the bleeding point where it adheres quickly and is completely absorbed. Oxidized celluloses are well adapted to control bleeding problems and hemorrhages associated with nasal surgery, spontaneous nasal hemorrhage, oral surgery, tooth removal, alveolectomy, hemophilia, thrombocytopenic purpura, and other blood dyscrasiae. Oxidized celluloses may also be used to inhibit bleeding on an abraded or damaged tissue surface, including the liver, spleen, heart, kidney, intestine, blood vessels, vascular organs, and the like. The cellulose is applied so that the actively bleeding abraded or damaged area is completely covered.

In addition, oxidized celluloses may be used for inhibiting the formation of tissue adhesions, such as spinal tissue adhesions following surgery and traumatic injury. Adhesions are unwanted tissue growths occurring between layers of adjacent bodily tissue or between tissues and internal organs. Adhesions commonly form during the healing which follows surgical procedures. When present, adhesions can prevent the normal motions of those organs tissues and organs with respect to their neighboring structures. The oxidized cellulose provides a physical barrier to separate tissues from each other during healing, so that adhesions between normally adjacent structures do not form. The oxidized cellulose remains intact during the initial stages of critical wound healing and, once this stage is complete, the barrier is no longer necessary, and by that time has already dissolved and been absorbed by the body.

Oxidized celluloses have been proven to promote guided bone and tissue healing after occurrence of an inflammatory, traumatic or surgical wound. When a patient's tooth is removed or when surgery is performed, in order to protect the proper environment required by the precursor bone cells to form new bone, the doctor may use powdered cellulose to facilitate guided regeneration of a bony deficit. Specifically, the cellulose may be shaped and placed over the deficit to prevent epithelial regeneration into an area where grafted bone or bone filler has been placed or compacted. (See e.g. U.S. Pat. No. 5,511,565 incorporated herein by reference). The cellulose may be secured into position by any number of means, such as sutures, pincers, etc. The barrier is also useful in protecting a blood clot which forms after a surgical procedure. By covering the clot, the barrier helps prevent osteitis, more commonly referred to as "dry socket".

The following examples are offers to illustrate but not limit the invention. Thus, they are presented with the understanding that various formulation modifications as well as method of delivery modifications may be made and still be within the spirit of the invention.

EXAMPLE 1

Preparation of Oxidized Cellulose

Acid solutions containing different weight ratios of nitric acid and sulfuric acid, or nitric acid and phosphoric acid, were prepared. To the acid mixture, cotton linter (tore into smaller pieces about 5–7 cm×5–7 cm) was suspended and then an appropriate amount of sodium nitrite was added. A dark brown gas immediately formed after adding the sodium nitrite into the acid mixture. The reaction container was covered with a petri dish to reduce the release of gas to the air. The reaction mixture was allowed to stand at room temperature, with occasional stirring using a glass rod, for 12, 24, 36 and 48 hours. The reaction was terminated by slowly adding an excess of water (about 10 times the volume of the reaction mixture). The resulting residue was collected by filtration, and washed with water until the filtrate showed a pH of 3–4. The wet OC cake was then suspended in acetone and filtered. The process was repeated until the OC appeared dehydrated. It was finally air dried at room temperature. The dried OC was ball milled for 24, and then sieved. The fraction between 74–105 $\mu$m was collected and used in this study.

EXAMPLE 2

Carboxylic Content of Oxidized Cellulose

Table 1 shows the yields and carboxylic content of oxidized cellulose prepared by reacting cotton linter with phosphoric acid, nitric acid, and sodium nitrite at 24±1° C. for 48 hours.

TABLE 1

Effect of different ratios of $H_3PO_4$ and $HNO_3$ mixtures on the oxidation level and yield of oxidized cellulose[a]

| Reaction no. | cotton linter (g) | Reaction Composition $H_3PO_4$:$HNO_3$ v/v | $NaNO_2$ (g) | % COOH (SD)[b] | yield (%) |
|---|---|---|---|---|---|
| 1 | 5 | 1:4 | 1 | 21.4 (0.1) | 92 |
| 2 | 5 | 1:2 | 1 | 23.5 (0.2) | 90 |
| 3 | 5 | 1:1 | 1 | 20.5 (0.2) | 88 |
| 4 | 5 | 2:1 | 1 | 21.6 (0.1) | 84 |
| 5 | 5 | 4:1 | 1 | 20.8 (0.3) | 86 |

[a]All reactions were performed on a 5 g scale (cotton linter weight) using a 1:15 (w/v) ratio of cotton linter to acid mixture ratio at 24 ± 1° C. for 48 hours.
[b]n = 3

As is evident, both yields and carboxylic content of oxidized cellulose are not affected by the acid composition. The carboxyl content in the samples was determined by the titration method described in the United States Pharmacopoeia (USPXXII). Briefly, about 0.5 g of the sample was accurately weighed and suspended in 50 ml of a 2% (w/w) calcium acetate solution for 30 min. The suspension was titrated with 0.1 N NaOH (standardized) using phenolphthalein as an indicator. The volume of NaOH solution consumed was corrected for the blank. The carboxylic content in the sample was calculated using the following relationship:

$$\%(w/w)\text{Carboxyl content} = N.V.MW_{COOH}/\text{Weight of sample} \times 100$$

Where N is the normality of the NaOH, and V is the volume of NaOH in milliliters consumed in titration, after correcting for the blank.

EXAMPLE 3

Effect of Reaction Time on Yields and Carboxylic Content of Oxidized Cellulose

The effect of reaction time on the yields and carboxylic content of oxidized cellulose are presented in Table 2. The reactions were performed on a 400 g scale (weight of cotton linter) and the conditions employed were the same as used for reaction 2 in Example 1 except for different time intervals.

TABLE 2

Effect of reaction duration on the carboxyl content and percentage yield of oxidized cellulose[a].

| Time (hour) | % COOH (S.D.)[b] | % Yield |
|---|---|---|
| 12 | 8.0 (0.1) | 81 |
| 24 | 13.4 (0.3) | 79 |
| 36 | 17.4 (0.2) | 78 |
| 48 | 18.4 (0.1) | 75 |

[a]Reaction compositions: Cotton linter 400 g; $H_3PO_4$:$HNO_3$ (1:2, v/v) 6000 ml; $NaNO_2$ 80 g. Reaction temperature 24 ± 1° C.
[b]n = 3

The results show that the carboxylic content linearly increases with increasing reaction time, whereas the yields of the product remain essentially unchanged (FIG. 1). Scanning electron micrographs of products isolated after 12, 24, and 48 hours (hereinafter referred to as OC-12, OC-24, and OC-48, respectively) demonstrate that the fiber length decreases with increasing the reaction time. When ball-milled for 96 hours, the long fibrous structures of the product turn into smaller fibers to loosely packed spherical aggregates. When powdered cellulose was used as the starting cellulose source, the oxidized cellulose product appeared as a mixture of fine powder and aggregates.

EXAMPLE 4

Characterization of Oxidized Cellulose (OC-12, OC-24, and OC-48)

The solid-state cross polarization/magic angle spinning carbon-13 nuclear magnetic resonance (CP/MAS $^{13}$C NMR) spectra of the OC-12, OC-24, and OC-48 samples described in Example 2, obtained on a Bruker MSL-300 NMR spectrometer operating at 75.47 MHz and equipped with NUTS data processing software (Acron NMR, Inc., Fremont, Calif.), show the structures of OC-12, OC-24, and OC-48 to be consistent with 6-carboxycellulose. The peak at 171 ppm was attributed to the oxidized C-6 and the peak in the region 61–65 ppm is to the unoxidized C-6. The cluster of signals in the region 71.6–76 was due to C-2, C-3 and C-5, and a peak at 104 ppm was due to the C-1. The doublet that was seen at 82 ppm and 88 ppm was assigned to C-4 located within the amorphous and crystalline regions of the oxidized cellulose, respectively. The peak at 93 ppm appeared to be due to C-1 of the α-D-glucose end unit that, according to Anderson et al. (29), forms when cellulose is oxidized with phosphoric acid and sodium nitrite.

The FT-IR spectra of the three samples (OC-12, OC-24, and OC-48) were similar except for the peak found at 1740 $cm^{-1}$, due to the carboxylic carbonyl stretching vibration, which increased in intensity with increasing carboxylic content in the material.

The degree of polymerization was determined from viscosity, η, measurements at 25±0.5° C. using the Canon-Fenske capillary viscometer (size 100), according to the equation: DP=190 [η], where [η] is the intrinsic viscosity calculated from the plot between $(ln\eta_{rel}/C)_{c\to 0}$ and C, or $(ln\eta_{rel}/C)_{c\to 0}$ and C, where C is the concentration in g/100 ml (30). The relative viscosity, $\eta_{rel}$, was calculated by dividing the viscosity of the sample (η) by the viscosity of the solvent ($\eta_0$), and $\eta_{sp}$ is the specific viscosity obtained by subtracting 1 from the relative viscosity value i.e., $\eta/\eta_0 - 1$. The viscosity measurement was performed as follows: an exact amount of cellulose sample (0.2–1 g on a dry basis) was weighted and suspended in 25 ml water in a 125 ml Erlenmeyer flask. The suspension was flushed with nitrogen to remove entrapped air from the sample. While nitrogen was being added, 25 ml of 1.0 M cupric ethylenediamine hydroxide (cuen) solution, used as a solvent, was added. Flushing of the suspension with nitrogen was continued for an additional 2 min. The Erlenmeyer flask was then stoppered and shaken with a wrist action shaker (Model 75, Burrell, Pittsburgh, Pa.) at room temperature of 30 min. The resulting cellulose solution was equilibrated at 25±0.5° C. Following the equilibration, the capillary viscometer was filled with the cellulose solution between the marks in the reservoir, and held vertically in the water bath. The suction was applied to the capillary tube to draw the solution into the upper bulb. The efflux time of the solution between the two marks was measured. The same procedure was employed to measure the efflux time of the 0.5 M cuen solution. The relative viscosity was calculated using the relationship: $\eta_{rel}$=efflux time$_{(sample)}$/efflux time$_{(solvent)}$. The results presented in Table 3 illustrate that the DP of oxidized cellulose decreased with an increase in the carboxyl content value.

TABLE 3

Degree of polymerization (DP) of oxidized celluloses

| | DP (n = 2) | |
|---|---|---|
| Oxidized cellulose | Method A[a] Average (range) | Method B[b] Average (range) |
| OC-12 | 81.3 (81.3–81.3) | 82.0 (81.4–82.6) |
| OC-24 | 62.9 (62.7–63.1) | 60.7 (60.3–61.1) |
| OC-48 | 52.7 (52.6–52.8) | 52.8 (52.7–52.9) |
| OC-12 (BM[c]) | 56.8 (56.6–57.0) | 57.9 (57.7–58.2) |
| OC-24 (BM[c]) | 51.1 (50.9–51.3) | 52.5 (52.3–52.6) |
| OC-48 (BM[c]) | 46.5 (46.0–47.0) | 44.2 (44.1–44.5) |

[a]Calculated using the [η] value determined from the $n_{red}/C$ ln $n_{sp}/c$ vs. C plots
[b]Calculated using the [η] value determined from [η]C reported in the literature for cellulose (34).
[c]ball-milled The DP of all products decreased further when ball-milled for 24 hours.

Figure 2:
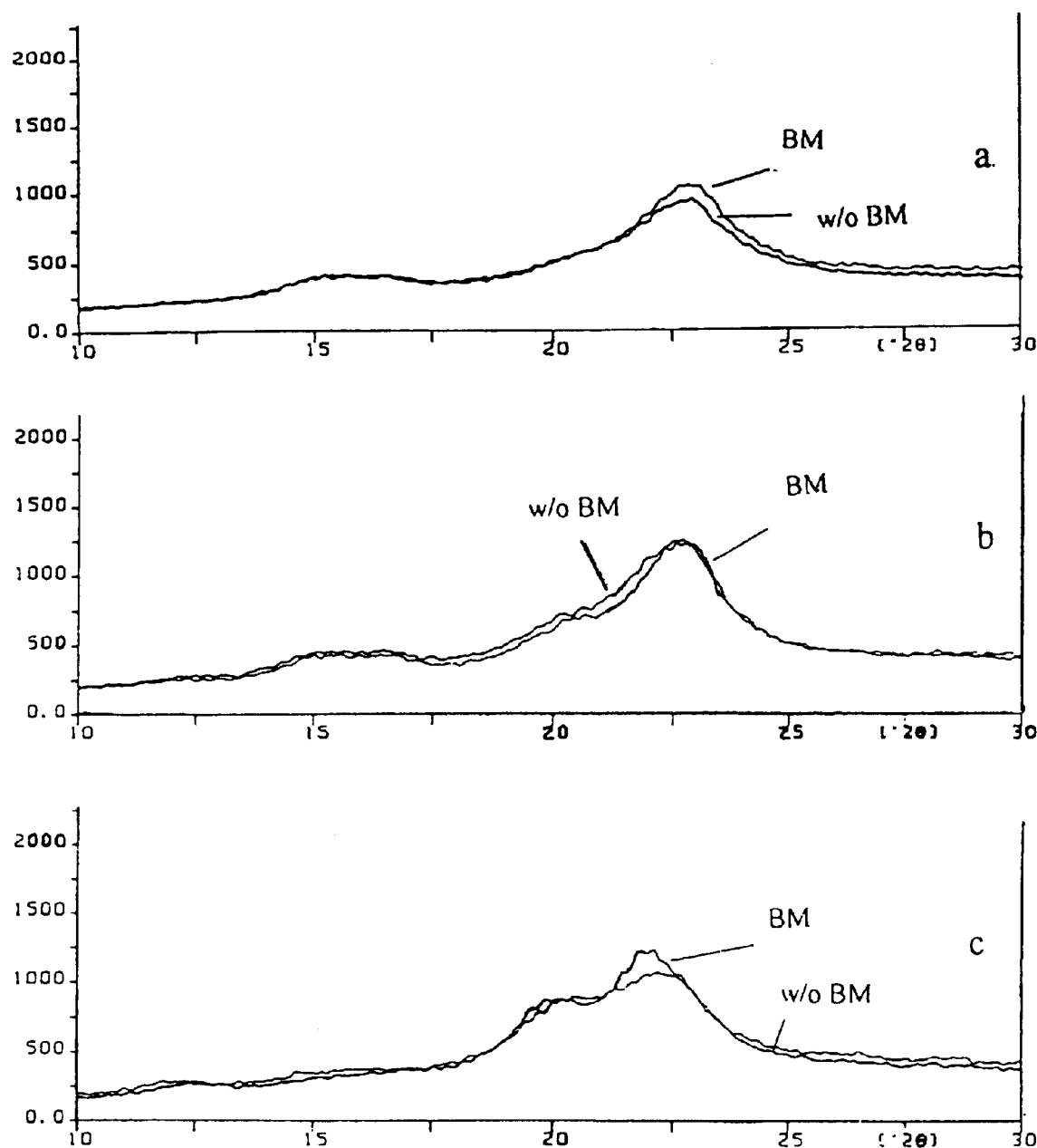
FIG. 2 shows the X-ray diffraction patterns of (a) OC-12, (b) OC-24, and (c) OC-48 before and after ball milling (for 24 hours).

The powder X-ray measurements on powders of OC samples were conducted on a Phillips PW 1710 powder X-ray diffractometer using monochromatic $CuK_\alpha$ radiation and a scanning rate of 3° 2θ/min. over 10–30° 2θ. A standard Philips sample holder was used. Hydrocellulose, prepared from a reaction between cotton linter and 2 N HCl at boiling temperature for 30 min., was used as the 100% crystalline reference. The integration of the crystalline reflections was achieved using the APD Phillips software version 2.01. The crystallinity of the samples was determined by integration of the crystalline reflections, and expressed as the percentage ratio of the integrated intensities of the sample to that of hydrocellulose. The powder X-ray diffraction patterns of the samples before and after ball milling for 24 hours are shown in FIG. 2. The crystallinity values determined are presented in Table 4.

TABLE 4

Degree of crystallinity of cellulose and oxidized cellulose products.

| Samples | % Crystallinity Average (range)[a] |
|---|---|
| Cotton linter | 75.0 (74.0–76.0) |
| Ball milled cellulose | 25.5 (23.6–27.3) |
| OC-12 | 38.0 (36.8–39.2) |
| OC-24 | 34.9 (33.1–36.9) |
| OC-48 | 26.9 (26.6–27.2) |
| OC-12 (BM[b]) | 33.8 (32.9–34.7) |
| OC-24 (BM[b]) | 32.6 (31.7–33.5) |
| OC-48 (BM[b]) | 28.7 (28.2–29.2) |

[a]n = 2
[b]ball-milled

The results clearly show that all OC products are relatively low crystallinity materials. Further, no change in the crystallinity of these samples occurs as a result of ball milling. A careful examination of FIG. 2, however, showed a subtle difference in the patterns of three materials. Sample obtained after 12 hours of reaction time showed a broad reflection covering the angular range from 13° 2θ to 17° 2θ and a weak peak at 22° 2θ, due to the cellulose I lattice. In contrast, samples obtained after 24 and 48 hours of reaction time showed additional broad peaks at ~12° 2θ and ~20° 2θ, attributable to the cellulose II polymorph. The intensities of these peaks were slightly higher in the 48 hours sample than in 24 hours sample. The X-ray results thus show that as the reaction time increases the formation of oxidized cellulose II increases.

Figure 3:
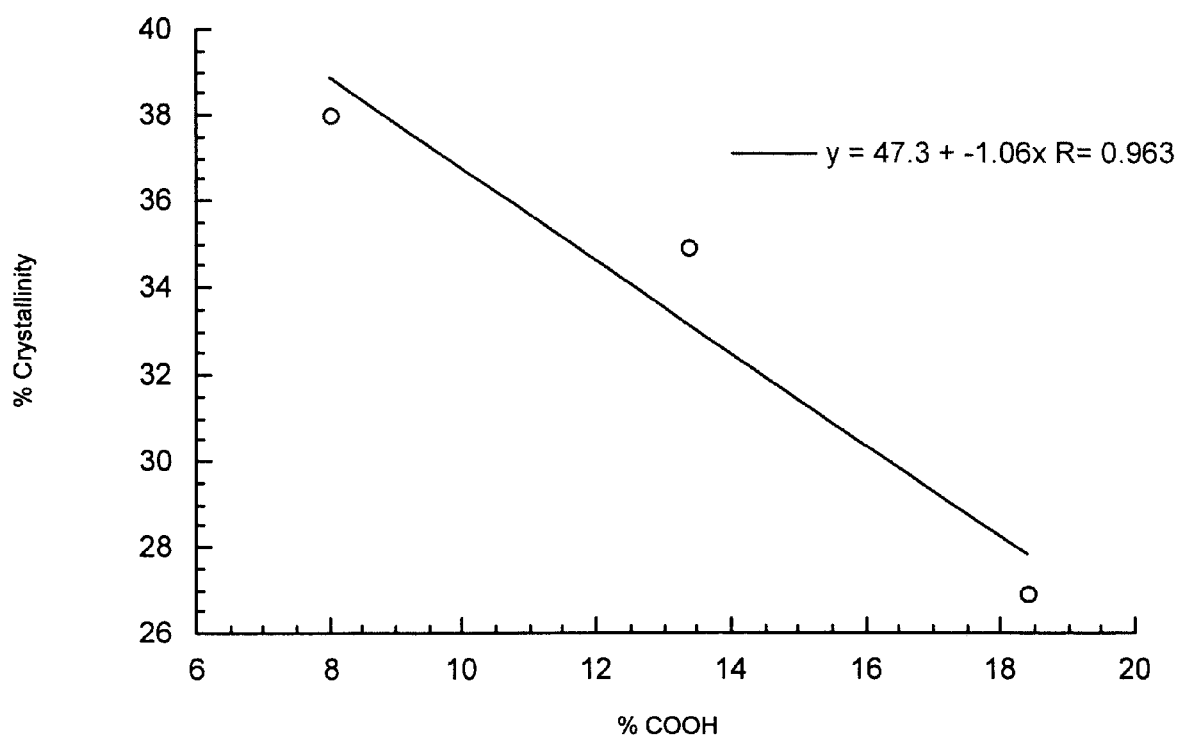
FIG. 3 shows the relationship between reaction time and crystallinity of oxidized cellulose.

FIG. 3 shows the crystallinity of oxidized celluloses decreases with increasing reaction time.

Figure 4:
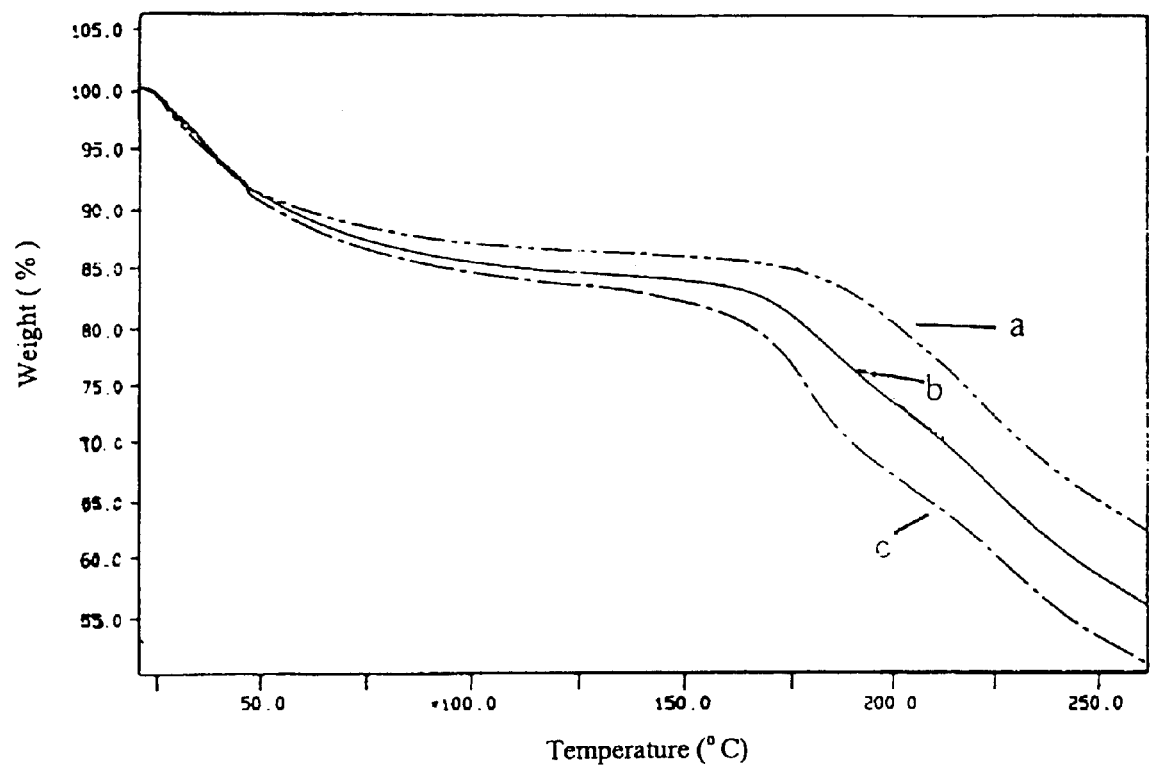
FIG. 4 shows TGA curves of (a) OC-12, (b) OC-24, and (c) OC-48.

FIG. 4 shows the TGA curves of the three new OC samples and the commercial product. As can be seen all products started to show weight loss at about 40° C. and degradation after about 160° C. The percentage weight loss results seen between the temperature range 40–125° C. are presented in Table 5.

TABLE 5

Volatile content in oxidized cellulose as determined by TGA.

| Oxidized cellulose | Volatile content (%) (S.D.)[a] |
|---|---|
| OC-12 (BM[b]) | 15.1 (1.0) |
| OC-24 (BM[b]) | 16.2 (0.6) |
| OC-48 (BM[b]) | 17.5 (0.7) |

[a]n = 3
[b]ball milled

This weight loss is due to the volatile substances, predominately water, contained in the samples. The degradation temperature determined from the TGA curves also varied inversely with the carboxyl content as shown in Table 6.

TABLE 6

Degradation temperatures of oxidized celluloses containing different carboxyl contents.

| Oxidized cellulose | % COOH (S.D.) | Degradation temp. (° C.) (S.D.)[a] |
|---|---|---|
| OC-12 (BM[b]) | 8.0 (0.1) | 180.9 (0.9) |
| OC-24 (BM[b]) | 13.4 (0.3) | 168.3 (0.6) |
| OC-48 (BM[b]) | 18.4 (0.1) | 164.8 (1.2) |

[a]n = 3
[b]ball-milled

These results suggest that oxidized cellulose materials have a lower thermal stability compared to pure cellulose, which degrades at a temperature over 250° C. (30), and the degradation temperature decreases with an increasing carboxyl content.

EXAMPLE 5

Oxidized Cellulose Microspheres Containing Camptothecin, an Antineoplastic Agent Materials Oxidized celluloses containing 7%, 13%, and 20% carboxyl content were used in the study. Glycerin Natural, USP (Spectrum Quality Products Inc., CA), polyethylene glycol 400, N.F. (Ruger Chemical Co., NJ), polyethylene glycol 6000, N.F. (Amend Drugs & Chemicals Co. NJ), 20(S)-camptothecin (Boehringer Ingelheim, Germany) were used as received. $^3H$-thymidine was obtained from Amercham Corp. (Arlington Heights, Ill.). All other chemicals and reagents were either analytical reagent or high performance liquid chromatography (HPLC) grades and used as received.

Preparation of Oxidized Cellulose Colloids

An appropriate amount of oxidized cellulose was dissolved in a minimum volume of sodium hydroxide solution (0.33N). To the resulting solution, 0.1N HCl solution, equivalent to the amount of sodium hydroxide used, was added drop wise with constant stirring. The resulting stable colloid was placed in a dialysis tube (MWCO 6K-8K, Spectrum Medical Industries) and dialyzed against 10-fold distilled water for 48 hrs. The distilled water was frequently replaced until the silver nitrate test showed a negative for chloride ions in the dispersion. The salt free OC-dispersion was stored in a freezer until use.

Preparation of Microspheres

To the OC dispersion, appropriate amounts of CPT and plasticizer (glycerin, PEG-400, or PEG-6000) were added. The resulting mixture was diluted with distilled water to 100 ml, sonicated (Branson 5200 sonicator, Branson Ultrasonics Co.) for 5 min., and then spray dried using a laboratory spray dryer (Pulvis mini-spray GB 22, Yamato Scientific Com, Tokyo, Japan). A standard two-fluid pressure nozzle with an orifice of 406 µm in diameter was used. During the spray-drying process, the feed suspension was constantly stirred by a magnetic stirrer.

Analysis of CPT

The lactone and carboxylate forms of CPT were analyzed by HPLC using a fully-automated Shimadzu LC-10 system, equipped with a fluorescence detector, a Supelco's C-18 discovery column (15 cm×4.6 mm, 5 am Supelco Park, Bellefonte, Pa.) and a guard column. The detector was set at an excitation wavelength of 370 nm and an emission wavelength of 435 nm. The mobile phase consisted of a 73.27 (v/v) mixture of triethylamine-acetate buffer (0.1% triethylamine, adjusted with glacial acetic acid to pH 5.5) and acetonitrile. A flow rate of 1 ml/min and an injection volume of 20 µl were used in the analysis. To avoid carryover between successive injections, the injector was washed thoroughly with methanol. The standard solutions of CPT-lactone and CPT-carboxylate were made by dilution of the CPT stock solution in dimethylsulfoxide (DMSO) with 0.02M HCl and 0.02M NaOH solutions, respectively. The analysis of the CPT-lactone was performed immediately, whereas that of CPT-carboxylate 30 min. after making the solution. Standard solutions of CPT-lactone and CPT-carboxylate were stable for two weeks at 4° C. and for 24 hours at room temperature.

Scanning Electron Microscopy (SEM)

Microspheres were further dried in vacuum at room temperature for 24 hrs. The dried samples were loaded on a stub covered with liquid graphite and then coated with gold, followed by a layer of carbon for 4 min in a Emitech K550 coater. The photographs were then taken on a Hitachi S-4000 scanning electron microscope using Polaroid films.

Determination of Microspheres' Size

The size of microspheres was estimated by manually measuring the diameter of 50 particles from the SEM photograph.

Analysis of Drug Loading

About 15 mg of the sample was accurately weighed and placed in a 500 ml volumetric flask. To this, 400 ml of 0.02N NaOH was added. The flask was then shaken until microspheres were completed dissolved. The solution was then made to the 500 ml mark with 0.02N NaOH solution. One ml of this solution was removed and diluted with 20-fold water, and then analyzed by HPLC.

In-vitro Drug Dissolution Studies

The dissolution of CPT from microspheres and physical mixtures and that of free CPT was evaluated in pH 7.4 phosphate buffer solution (composition: 137 mM NaCl, 3 mM KCl, 8 mM $Na_2HPO_4$, 1 mM $KH_2PO_4$), containing 0.02% Tween 80 at 37° C. under sink conditions. Briefly, an accurately weighed amount of microspheres was suspended in the buffer medium. The suspension was placed in a dialysis bag (MWCO 350, Snakeskin™) and then dialyzed against the buffer solution. 1 ml of the release medium was removed at the predetermined time intervals. To maintain the sink condition, an equal volume of the fresh buffer solution was immediately added to the release medium. The concentrations of both lactone and carboxylate forms of CPT in the release media were determined by HPLC assay.

Evaluation of Cytotoxicity

Figure 6:
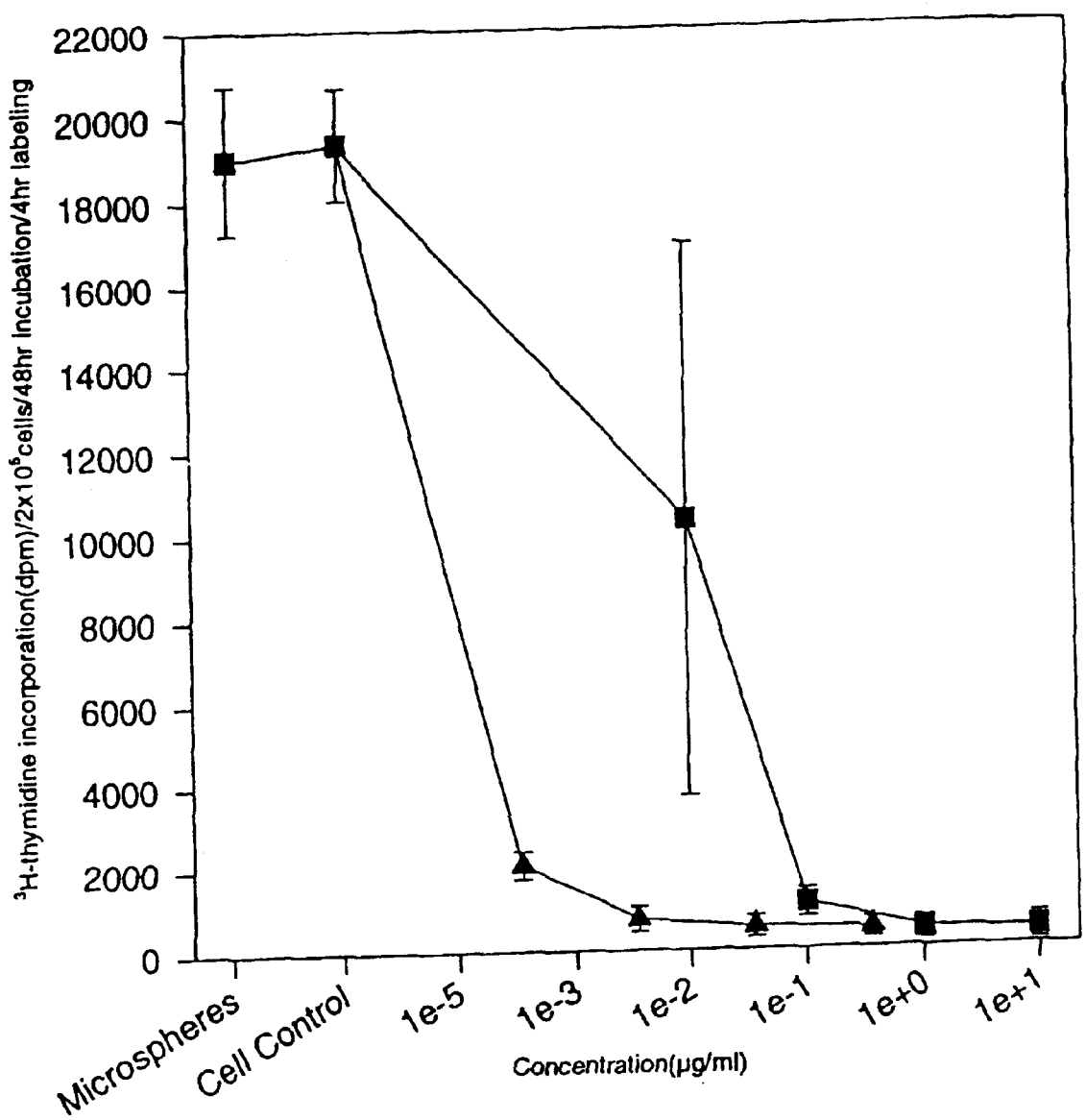
FIG. 6 shows the effect of varying concentrations of CPT (■) and OC—(COOH 20%)/CPT microspheres (▲) on the inhibition of DNA synthesis in the human-derived myeloid THP-1 leukemia cells.

The cytotoxicity of free CPT and OC—(COOH 20%)/CPT microspheres was evaluated against human-derived lymphoid RPMI-8402 (FIG. 7) and myeloid THP-1 leukemia cell lines (see FIG. 6). These cell lines were chosen because CPT has been shown to be active against leukemia cancers. The cells were diluted to $1\times10^6$ cells/ml in RPMI 1640 media, supplemented with 1% pen/strep, 1% glutamine, and 10% fetal calf serum, and plated in triplicate at the $2\times10^5$ cells/well in a 96 well plate. CPT or OC—(COOH 20%)/CPT microspheres were then added, at the equal concentrations, to the wells and the cells were incubated for 20 hours at 37° C. and in 5% $CO_2$. Radiolabeled thymidine (0.04 µci/well) was added to each well at 20 hours and 24 hours. The cells were harvested onto a Reeves Angel 934 AH filter using a Brandel automated cell harvester. Radiolabeled DNA was then measured as disintegration per minute (dpm) by scintillation spectroscopy.

Results

The compositions of aqueous OC dispersions and spray drying conditions used to prepare microspheres are presented in Table 7.

TABLE 7

Effect of Plasticizers on OC microspheres.

| OC | Plasticizer | Diameter (µm) | Appearance[b] |
|---|---|---|---|
| OC—(COOH-7%) | Glycerin | 1.25 ± 0.50 | S |
| OC—(COOH-7%) | PEG 400 | 1.35 ± 0.45 | S |
| OC—(COOH-7%) | PEG 6000 | 1.29 ± 0.47 | S |
| OC—(COOH-13%) | Glycerin | 1.44 ± 0.65 | S |
| OC—(COOH-13%) | PEG 400 | 1.52 ± 0.47 | S |
| OC—(COOH-13%) | PEG 6000 | 1.33 ± 0.48 | S |
| OC—(COOH-20%) | Glycerin | — | S |
| OC—(COOH-20%) | PEG 400 | 1.33 ± 0.43 | S |
| OC—(COOH-20%) | PEG 6000 | 1.25 ± 0.40 | S |

[a]Feed composition (w/w): OC solid 1%, plasticizer 0.3%, and CPT 0.1%. Spray conditions: inlet temperature 170° C.; Feed rate 1 ml/min.; drying air flow rate 0.3 ml/min.; outlet temperature 70° C.; and atomizing air pressure 1 kg f/cm².
[b]S = spherical As noted in Table 7, irrespective of the carboxylic content of OC and the nature of the plasticizer being used, the spray drying method produced spheres with a smooth surface. The size of microspheres ranged from 1.25±0.40 µm to 1.52±0.47 µm. The change in the concentration of plasticizer (from 15 to 30% with respect to the dry weigh of OC) and CPT in the feed suspension did not cause any significant change in the morphology or size of the microspheres.

In vitro Dissolution Studies

Figure 5:
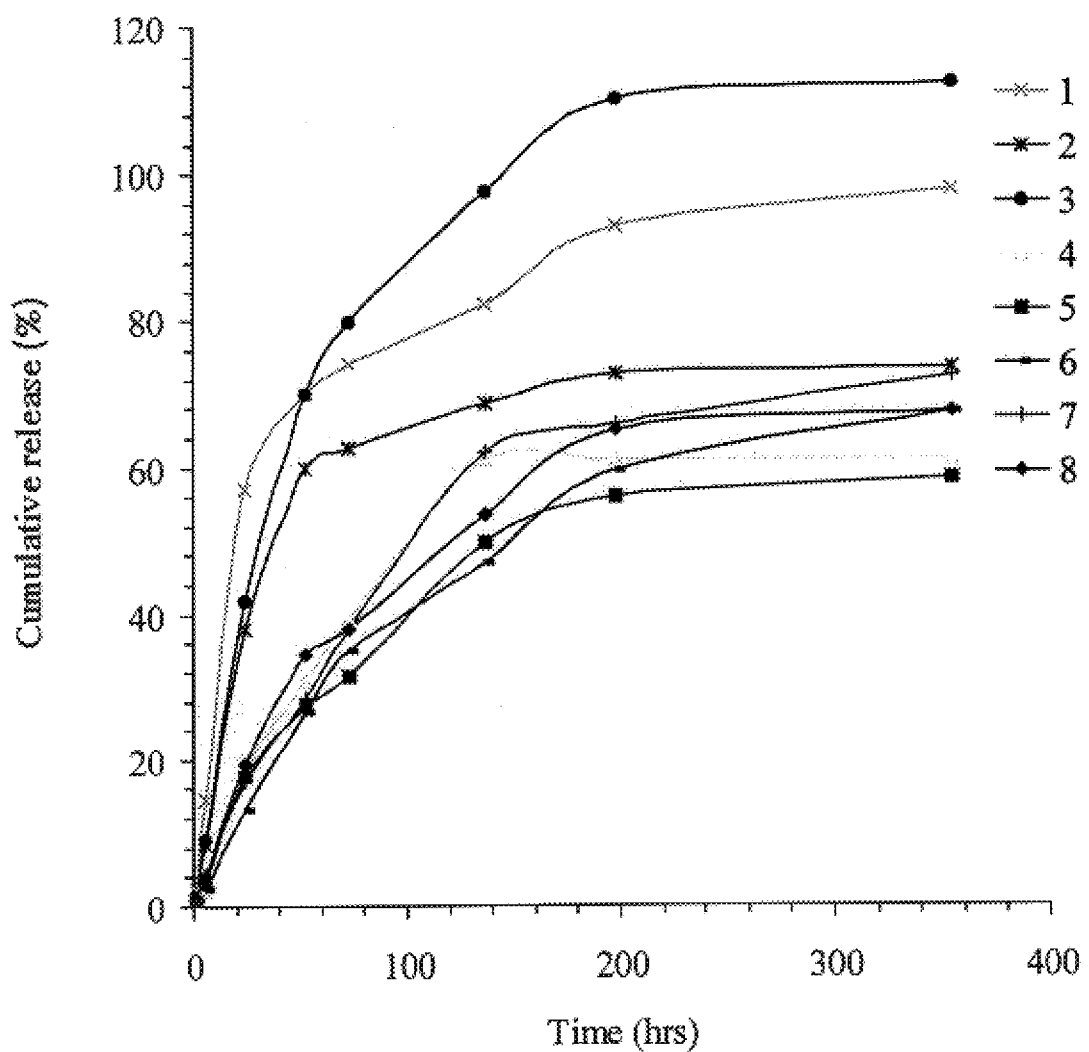
FIG. 5 shows dissolution profiles of CPT from (1) microspheres (OC—COOH 20%); (2) microspheres (OC—COOH 13%); (3) microspheres (OC—COOH 7%); (4) physical mixture OC (COOH 7%)+CPT; (5) physical mixture OC (COOH 20%)+CPT; (6) physical mixture PEG 6000+CPT; (7) physical mixture OC (COOH 20%)+PEG 6000+CPT; and (8) CPT.

The dissolution profile of CPT (total) from three microsphere formulations, physical mixtures containing CPT, PEG, and OC, and free CPT in pH 7.4 phosphate buffer is shown in FIG. 5. OC microspheres prepared using 7, 13, and 20% carboxylic content contained 63.5%, 56.5%, and 40.5%, corresponding to 0.064, 0.057, and 0.041%, respectively, of the initail 0.1% CPT used in the dispersion. As is evident, the dissolution of CPT was faster from the microsphere formulations than from physical mixtures. Free CPT also had a slower dissolution rate compared to the formulations. This is attributed to the smaller particle size of the microspheres compared to that of controls. The time to release 50% CPT (T 50%) from microspheres prepared using OC containing 7%, 13%, and 20% carboxylic content were about 31, 37, 19 hours, respectively (Table 8). The relatively faster dissolution of CPT from OC with 20% carboxylic content than from microspheres prepared using OC containing 7% or 13% carboxylic content could be due to the higher hydration properties of the polymer.

TABLE 8

Dissolution of CPT.

| Sample | T-50 (hrs) |
|---|---|
| 20% carboxyl-OC microspheres | 18.7 |
| 13% carboxyl-OC microspheres | 37.4 |
| 7% carboxyl-OC microspheres | 31.2 |
| Physical Mixtures: | 98.8 |
| 7% carboxyl-OC + CPT mixture | — |
| 20% carboxyl-OC + CPT mixture | 135.2 |
| CPT + PEG6000 | 147 |
| 20 carboxyl-OC + CPT + PEG6000 | 98.8 |
| Free CPT | 118.6 |

Figure 7:
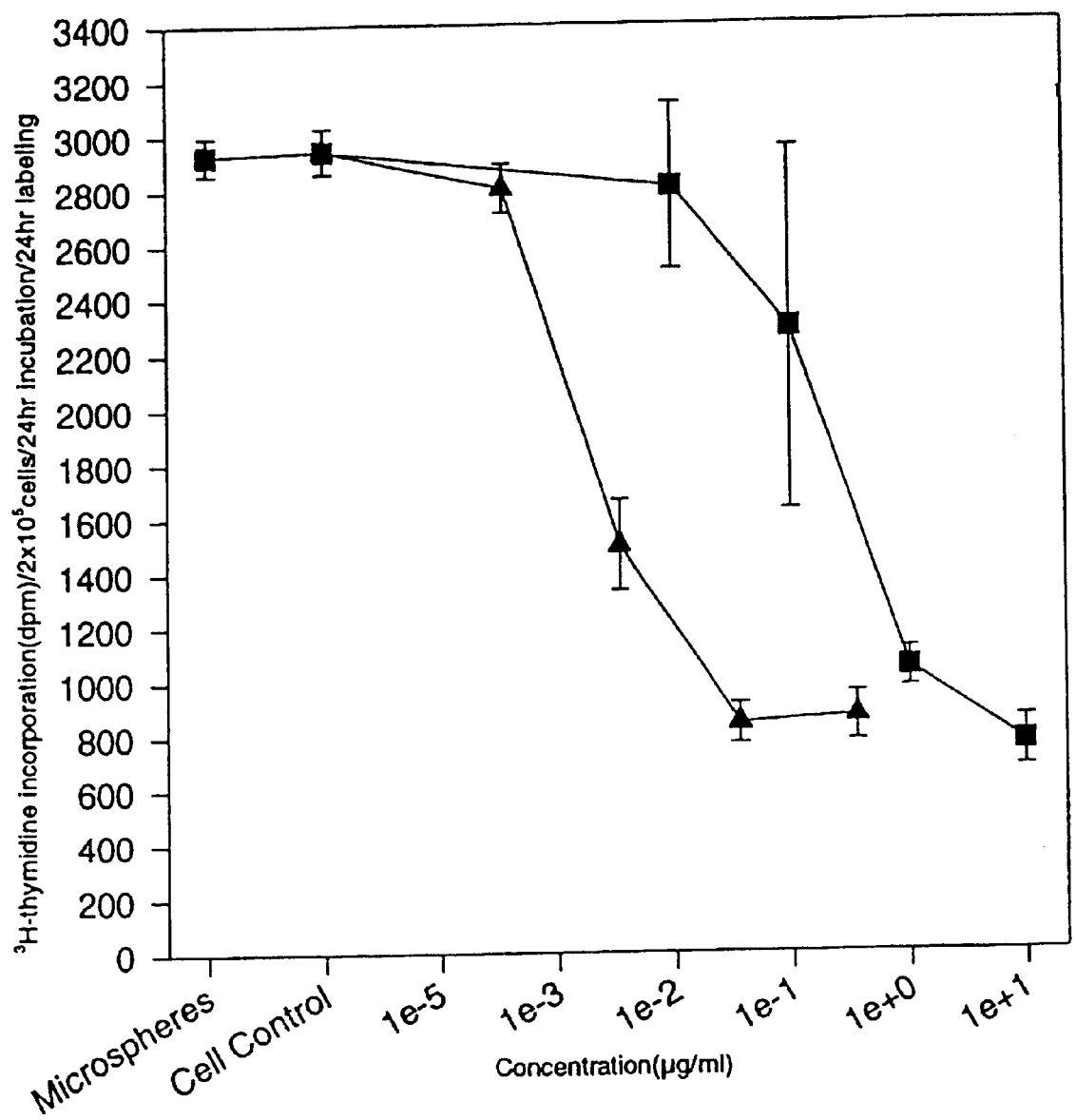
FIG. 7 shows the effect of varying concentrations of CPT (■) and OC—(COOH 20%)/CPT microspheres (▲) on the inhibition of DNA synthesis in the human-derived lymphoid RPMI-8402 leukemia cells.

The results of cytotoxicity evaluation of free CPT and OC—(COOH 20%)/CPT microspheres against lymphoid RPMI-8402 and myeloid THP-1 cell lines are depicted in FIGS. 6 and 7, respectively. As is evident, the microsphere formulation is more effective than free CPT, corresponding to $ED_{50}$ values of $1\times10^{-5}$ μg/ml and $0.5\times10^{-2}$ μg/ml (versus $0.25\times10^{-1}$ μg/ml and 0.75 μg/ml for free CPT) against lymphoid RPMI-8402 and myeloid THP-1 cells, respectively.

The results presented in this paper show that microspheres prepared using aqueous dispersions of OC containing different carboxylic content can be used to enhance dissolution of camptothecin, a highly potent antineoplastic drug whose bioavailability and consequently cytotoxicity is limited by its poor aqueous solubility and rapid hydrolysis in physiological fluids. The significantly higher activity of the microsphere formulation, compared to free CPT, observed against human lymphoid and myeloid derived leukemia cell lines is attributed to both increased solubility and stability of CPT rendered by OC, owing to its hydrophilic and (weak) acidic character.

EXAMPLE 6

Immobilization of Bovine Serum Albumin on OC

Materials

Oxidized cellulose containing 16% carboxylic content was used. Sodium stearyl fumerate (PRUV®) and sesame oil were received from Penwest Company (formerly Mendell Co. Inc., Patterson, N.Y., USA) and Croda Inc. (New York, N.Y., USA), respectively. BSA and castor oil were purchased from Sigma chemical Co. (St. Louis, Mo., USA) and Ruger Chemicals (Hillside, N.J., USA), respectively. The coomassie blue concentrate was obtained from Bio-Rad Laboratories (Hercules, Calif., USA). All other chemicals were analytical grade.

Immobilization of BSA on OC

Stock solutions of BSA in water and aqueous buffer solutions (pH 2 and 3:0.01M citrate buffer; pH 4 and 6:0.01M acetate buffer; and pH 7:0.01M phosphate buffer), corresponding to the BSA concentration of 1 mg/ml, were prepared. To a 10 ml BSA stock solution, 100 mg of OC was added and the mixture was stirred at 5° C. for different time periods using a magnetic stirrer. The reaction suspension was then centrifuged for 10 minutes at 1000 r.p.m. The supernatant was removed and analyzed for BSA (vide infra). The residue was collected, freeze-dried, and stored in a freezer (~5° C.) until used.

Determination of BSA Loading

The amount of BSA bound to OC was determined by the Bradford method using Coomassie blue as a reagent. The latter was prepared by diluting one part of the Coomassie blue concentrate with four parts of distilled water. For BSA analysis, 2.5 ml of the Coomassie reagent and 100 μl of the BSA solution were taken in a stoppered quartz cell (1 cm width) and mixed. At the end of one minute, the absorbance measurement was made at 595 nm using an ultraviolet-visible spectrophotometer (Shimadzu UV 2100U, Shimadzu Corp., Kyoto, Japan). The amount of BSA bound to OC was determined from the difference in BSA concentrations before and after treating the solution with OC. Control BSA solutions, containing no OC, were also analyzed at different time intervals, and appropriate corrections were made to the BSA loading. Table 9 shows the amounts of BSA loaded on OC.

TABLE 9

Amounts of BSA Loaded on OC.

| Reaction medium pH | Percent Binding (Std. Dev.) |
|---|---|
| pH 2 | 10.52 ± 0.15 |
| pH 3 | 8.96 ± 0.22 |
| pH 4 | 9.16 ± 0.23 |
| pH 6 | 6.05 ± 0.08 |
| pH 7 | 2.69 ± 0.07 |
| Water (pH 2.4[a]) | 9.82 ± 0.30 |

[a]pH of the OC dispersion

Preparation of OC-BSA Pellets

The OC-BSA powders prepared in water and 0.01M citrate buffer (pH 2.0) were used in the study. They were compressed, with and without 0.5% PRUV®, on a Carver press using a ⅓ inch die and flat-faced punches. Each pellet weighed 30 mg, and showed a hardness value of 6–7 kp as measured on a Schlenniger 2E/106 hardness tester.

Release Studies

The release of BSA was studied from powder, pellet (with and without 0.5% PRUV®, and oil suspension dosage forms of OC-BSA, prepared in water and pH 2 buffer solution. The oils used in the study were castor oil and sesame oil. An accurately weighed amount of the test sample was suspended in 10 ml phosphate butter solution (pH 7.4) containing 10% (v/v) ethanol using a shaker at 37° C. . Hundred microliters of the supernatant were withdrawn at 4, 10, 24 hours and then every 24 hours for 6 days, and analyzed immediately spectrophotometrically at 595 nm for BSA by the Bradford method, as described above. The control solution used in the study was a pH 7.4 phosphate buffer solution containing the same amount of BSA as was present in the test sample and 10% (v/v) ethanol. This solution was stored at 37° C. and analyzed at the same tie intervals as the test samples. The results obtained were used to make appropriate corrections to the BSA amounts released from the test samples.

Results

Figure 8:
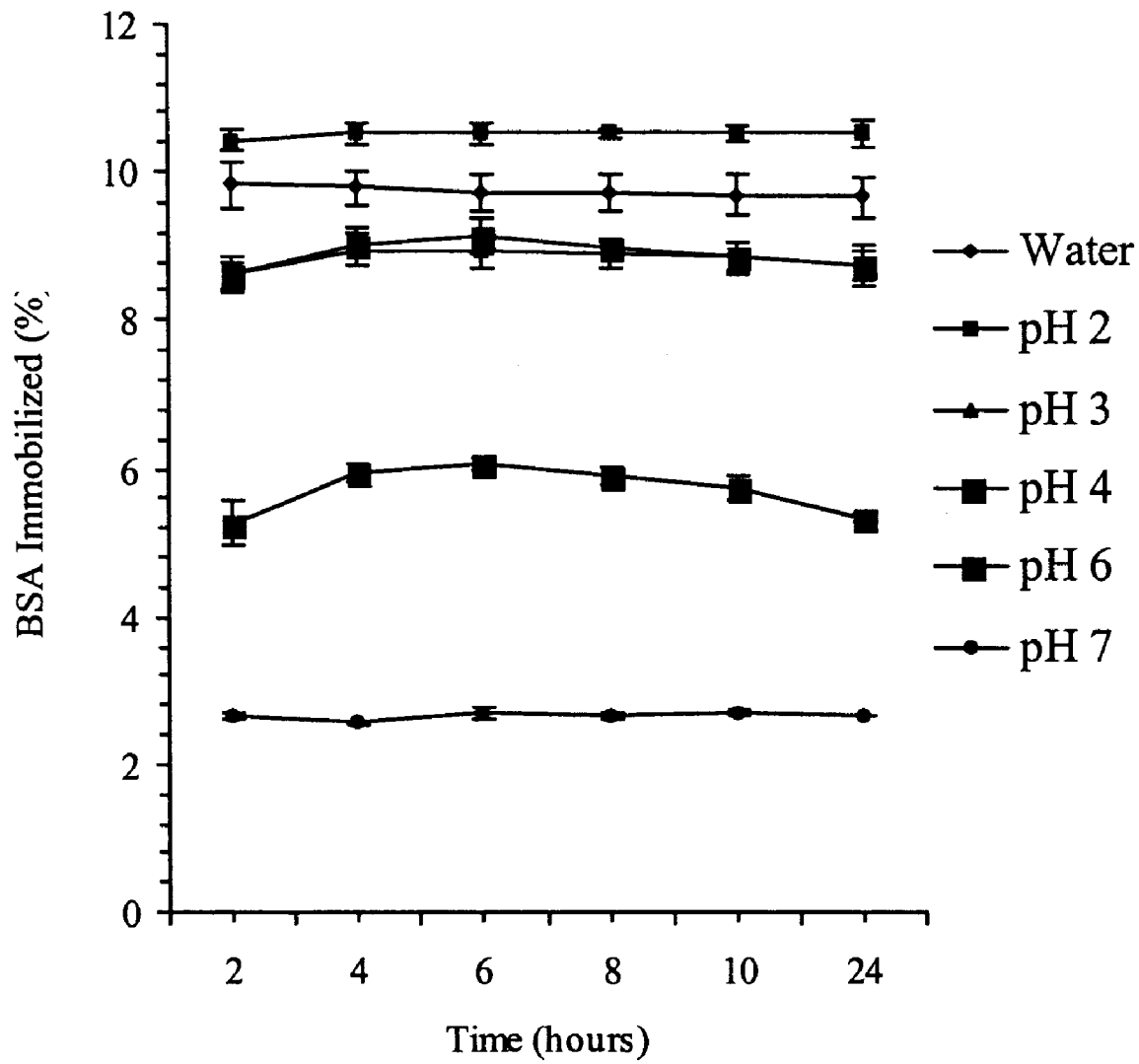
FIG. 8 shows the effect of reaction duration on the binding of BSA to OC (n=3).

The binding of BSA to OC in water and different buffer solutions (pH 2–7) is shown in FIG. 8. As is evident, the immobilization of BSA on OC was completed in about two hours in water, about four hours in pH 2 and 3 buffer solutions, and about six hours in pH 4, 6, and 7 buffer media. The percentage amounts of BSA loaded on OC in water and different buffer solutions are presented in Table 8. The immobilization of BSA on OC, in general, decreased linearly with increasing pH of the reaction medium ($R^2$= 0.9147). The high loading of BSA seen in water can attributed to the pH effect because OC being a weak polyacid (pKa 3.5 and 4.0) (22) partially dissociates in water and produces a suspension with a pH of about 2.4.

The isoelectric point of BSA is 4.8–5.0 (23). Thus, in pH 2 buffer and water, it appears that the immobilization of BSA on OC takes place via both physical adsorption (i.e., hydrogen bonding, hydrophobic interactions, and/or van der Waal forces) and ionic interaction (1,20), the former being the predominant mechanism. At higher pH conditions, however, OC—COOH progressively ionizes to OC—COO$^-$, while BSA converts from a fully protonated form, ($NH_3^+$—BSA—COOH), to a zwitterion ($NH_3^+$—BSA—COO$^-$) and subsequently to $NH_3^+$—BSA—COO$^-$. Thus, as the pH increases, more and more ionic interaction between OC and BSA dominates, causing a progressive increase in the formation the water-soluble OC-BSA complex, and consequently, a decrease in the yield of the insoluble OC-BSA immobilization product. At or above pH 7.0, OC and BSA predominantly exist as OC—COO$^-$ and $NH_3$-BSA-COO$^-$, respectively, and hence, the yield of OC-BSA is significantly decreased.

Figure 9:
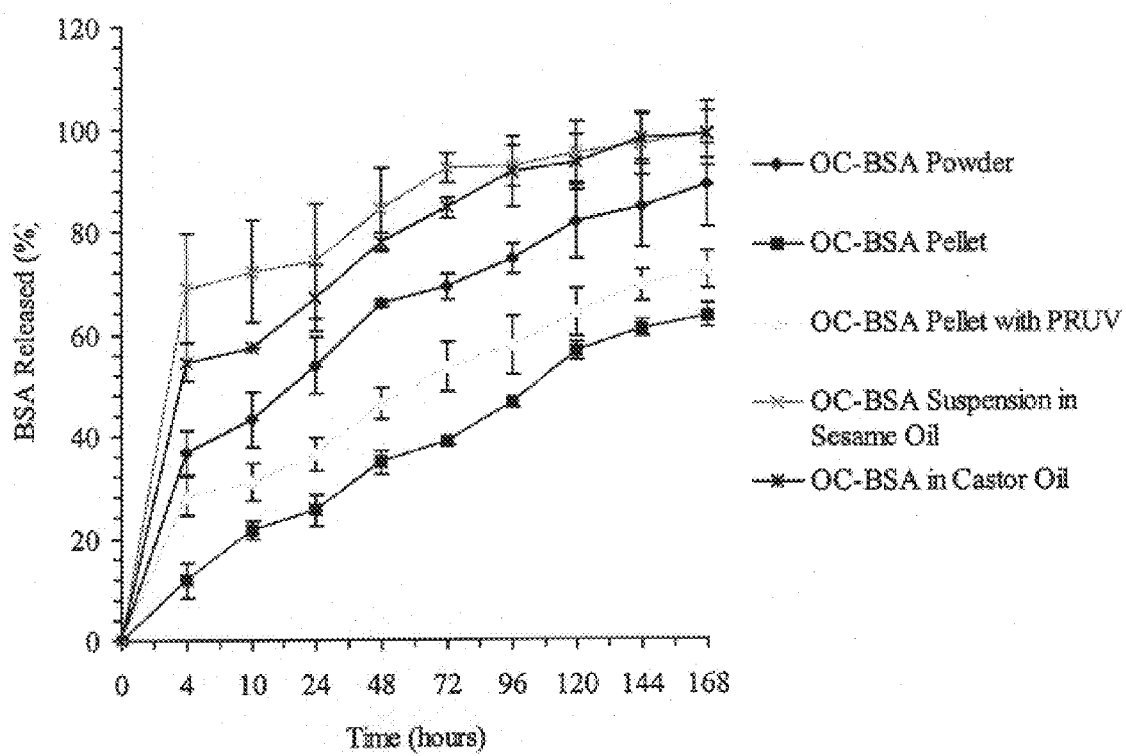
FIG. 9 shows release profiles of BSA from powder, pellet and oil suspension dosage forms of OC-BSA, prepared in water (n=3).
Figure 10:
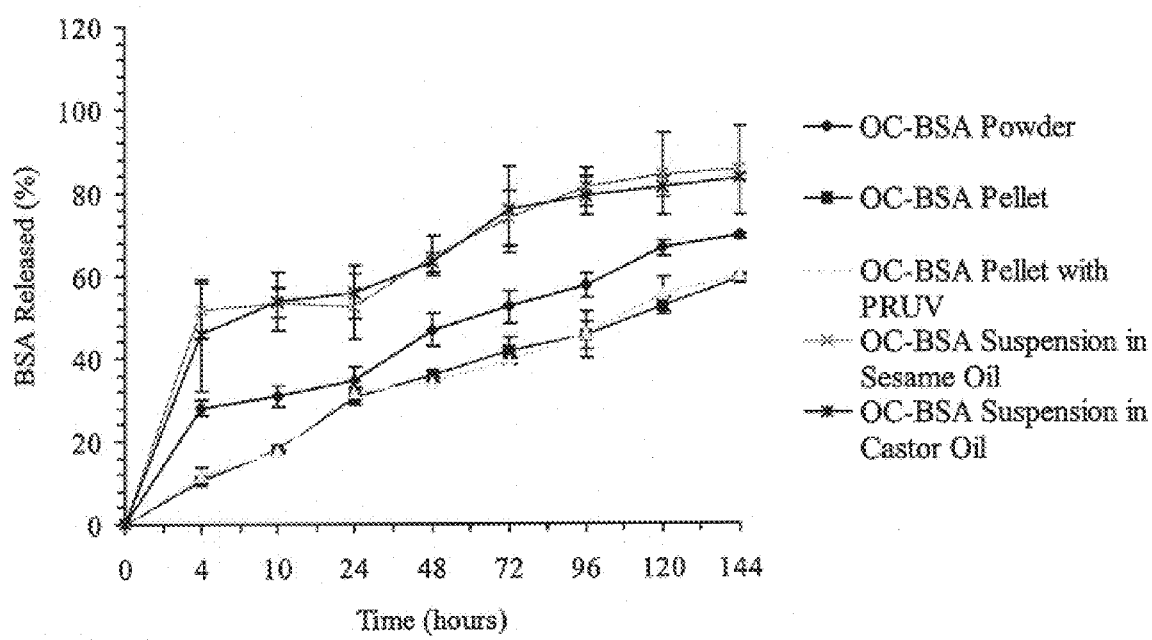
FIG. 10 shows release profiles of BSA from powder, pellet, and oil suspension dosage forms of OC-BSA prepared in pH 2.0 buffer solution (n=3).

The release profiles of BSA from powder, pellet and suspension dosage forms of OC-BSA, prepared in water, are shown in FIG. 9. All samples, except for the pellets that had no PRUV®, exhibited an initial fast release ("burst effect"). In the first four hours, the amounts of BSA released from OC-BSA suspensions in sesame oil and castor oil were about 69% and 55%, respectively, from OC-BSA powder about 37%, and from OC-BSA pellet containing 0.05% PRUV® about 28%. After four hours, all samples released BSA slowly. After six days, the 100% of BSA were released from castor and sesame oil suspensions of OC-BSA. The powder and pellet, with and without PRUV®, forms, in contrast, released only 90%, 64%, and 72% of BSA, respectively, over the same time period.

FIG. 10 shows the release profiles of BSA from OC-BSA prepared in pH 2.0 buffer solution. As is evident, both castor oil and sesame oil suspensions of OC-BSA exhibited similar release profiles. OC-BSA pellets with and without PRUV® also showed no significant difference in their release patterns. After four hours, the amounts of BSA released from OC-BSA suspensions, powder, and pellets were 49%, 28%, and 11%, and After six days, about 84%, 69%, and 59%, respectively.

The above results show that (i) irrespective of whether OC-BSA was prepared in water or pH 2.0 buffer, the release of BSA was the fastest from oil suspensions, intermediate from the powder forms, and the slowest from the pellet formulations, and (ii) OC-BSA prepared in water released BSA at a faster rate than that made in pH 2.0 buffer solution. The faster release of BSA from the sesame oil and castor oil suspensions compared to that from the respective OC-BSA powders may be due to the plasticization effect of oils on OC. The difference in the release properties of OC-BSA prepared in water versus that made in pH 2 buffer could be due to different proportions of interaction forces present between OC and BSA.

The results presented above show that the immobilization of BSA on OC is favored at low pH conditions and in water. The release of BSA was the fastest (84–100%) from OC-BSA suspension in oils (castor and sesame oils), intermediate (69–90%) from OC-BSA powders, and the slowest (59–72%) from OC-BSA pellets, over six days, suggesting that the pellet form is useful as a sustained-release delivery system whereas powder and suspension forms may serve as a pulse-release delivery system. The presence of PRUV® in the pellets did not change the release profile of BSA.

The results presented conclusively show that OC, being biodegradable and biocompatible, can serve as an immobilizing matrix for proteins to produce a biodegradable sustained release delivery system.

All articles cited herein and in the following list are hereby expressly incorporated in their entirety by reference.

CITATIONS

1. G. S. Sizerega, *Fertil. And Steril.*, 61: 219–235 (1994).
2. I. Abaev, V. E. Kaputskii, A. A. Adarchenko, O. P. Sobeshchukh, *Antibiot. Med. Biotekhnol.*, 31:624–8 (1986).
3. M. D. Finn, S. R. Schow, E. D. Schneiderman, *J. Oral Maxillfac. Surg.*, 50 (6): 608–621 (1992).
4. R. P. Pollack, O. Bouwsma, *Compendium*, 13:888, 890, 892 (1992).
5. W. H. Ashton. Oxidized cellulose product and method for preparing the same, U.S. Pat. No. 3,364,200 (1968).
6. M. Otterlei, T. Espevik, G. Skijak-Brock, O. Smidsrod. Dieuatorially bound beta-1,4 polyuronates and use of same for cytokine stimulation, U.S. Pat. No. 5,169,840 (1992).
7. S. D. Dimitrijevich, M. Tatarko, R. W. Gracy. *Carbohydr. Res.*, 195:247–256 (1990).
8. S. D. Dimitrijevich, M. Tatarko, R. W. Gracy, G. E. Wise, L. X. Oakford. *Carbohydr. Res.*, 198:331–341 (1990).
9. E. B. Dol'berg, L. N. Shuteeva, B. G. Yasnitskii, G. V. Obolentseva, Y. I. Khadzhai. Y. A. Fumanov. *Khim-Farin. Zh*, 8:23–26 (1974); CA 82, 5473j.
10. B. G. Yasnitskii, E. G. Dol'berg. USSR Patent 389,794, 1973; CA 80, 137175g.
11. B. G. Yasnitskii, E. G. Dol'berg, L. N. Shuteev, I. P. Kovalev, *Zh. Prikl.Khim* (leningrad), 46:212–2123 (1986); CA 107, 83903v.
12. A. I. Balakleevskii, N. I. Gubkina, S. V. Tkachev, R. L. Khaniia, M. I. Kalinakii, V. N. Kotsyuruba. USSP SU 1,266,541 (1986); CA 107, 83903v.
13. G. P. Sosnin, A. I. Balakleevskij, N. I. Dmitrieva. USSR SU 1,822,768 (1993); CA 122, 96546u.
14. V. A. Stel'makh, M. I. Apshchenko, V. V. S. Lyakov, L. I. Soroka. Ser. Biyal. Nayuk, 2: 67–72 (1994); CA 123, 25258m.
15. A. A. Firsov, A. D. Nazarov, I. P. Fomina. *Drug Dev. Ind. Farm.*, 13 (9–11): 1651–74 (1987).
16. F. N. Kaputskii, P. M. Bychkovskii, T. L. Yurkshtovich, S. M. Butrim, E. V. Korolik, D. K. Buslow. *Colloid J.*, 57:42–45 (1995).
17. R. I. Kosterova, T. L. Yurkshtovich, F. N. Kapucky, N. V. Golub. Ser. *Khim. Navuk* 2:12–17 (1993); CA 121, 141360w.
18. T. Zimatkina, T. Yurkshtovich, S. Zimatkin, F. Kaputsky. *Pol. J. Pharmacol.*, 48(2):163–169 (1996).
19. V. A. Alinovskaya, T. L. Yurkshtovich, F. N. Kaputskii. *Ser. Khim. Navuk* 3:27–31 (1989) (RUSS); CA 111, 149445s.
20. V. A. Alinovskaya, T. L. Yurkshtovich, F. N. Kaputskii, V. M. Talapin V. A. Stwl'makh. USSR SU 1,406161 (1988).
21. T. Heinze, W. G. Glasser, *Cellulose Derivatives: Modification, Characterization, and Nanostructures*, 1998, 73–82.
22. V. U. T. Statni., French Patent 2,408,624 (1979).
23. V. U. T. Statni, Netherlands Patent 77,111,034 (1979).
24. H. Wanleg, U.S. Pat. No. 2,758,112 (1956).
25. A. M. Walimbe, B. N. Pandya and J. K. Lalla, *Res. And Ind.*, 23, 162–165 (1978).
26. Th. Heinze, D. Klemm, M. Schnabelrauch, I. Nehls. In: *Cellulosics: Chemical, Biochemical and Material Aspects*, Ed. J. F. K., G. O. Phillips, P. A. Williams, E. Horwood, new york, 1993, S. 349–355.
27. C. Bertocchi, P. Konowicz, S. Signore, F. Zanetti, A. Flaibani, S. Paoletti\and V. Crescenzi, Carbohydr. Poly., 27, 295–297 (1995).

28. M. V. Gert, O. V. Shishonok, V. I, Torgashov and F. N. Kaputskii, *Poly. Sci. Ser.*, A. 37, 670–675 (1995).
29. R. Andersson, J. Hoffman, N. Nahah, E. Scholander, *Carbohydr. Res.*, 206:340–346 (1990).
30. A. R. Procter and R. H. Wiekenkamp, *J. Polym. Sci.*, Part C, No. (28), 1–13 (1969).
31. S. Wei, V. Kumar and G. S. Banker, Int. *J. Pharm.*, 142, 175–181 (1996). 32. A. Mazur and B. Harrow. *Textbook of Biochemistry*, Saunders, Philadelphia, Pa., 10th edition, 1971.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of making an oxidized cellulose containing carboxyl groups comprising: soaking a source of cellulose in a reaction mixture containing an amount of concentrated phosphoric acid and concentrated nitric acid to form an acid mixture; thereafter adding sodium nitrite to the acid mixture to form an oxidizing mixture; allowing the sodium nitrite to react with the acid mixture for a period of time of up to about 48 hours, said reaction occurring at a temperature ranging between 15–28° C.; terminating the reaction by adding an excess of water to the oxidizing mixture; and filtering the oxidized cellulose from the oxidizing mixture, said oxidized cellulose having a degree of polymerization of 82 or less, and a degree of crystallinity of 38% or less.

2. A method according to claim 1 further including the step of:

washing the oxidized cellulose following the filtering step.

3. A method according to claim 2 further including the step of drying the oxidized cellulose.

4. A method according to claim 1 wherein the cellulose source is selected from the group consisting of cotton linter, alpha-cellulose, hard or soft wood pulp, purified wood pulp, and cotton linter sheet or pulp and cellulose powder prepared from chemical and mechanical disintegration of the cellulose source.

5. A method according to claim 1 wherein the cellulose source is cotton linter in sheet or pulp form or powder prepared by mechanical or chemical disintegration of cotton linter sheet.

6. A method according to claim 1 wherein the reaction mixture contains, with respect to the acid mixture, a 1:>5 weight-to-volume ratio of cellulose and acid mixture, from 0.1–9.9 to 9.9:0.1 volume-by-volume ratio of phosphoric acid and nitric acid, and 0.5 to 3.0% by weight ratio of sodium nitrite.

7. A method according to claim 1 wherein the sodium nitrite is added in portions.

8. A method according to claim 1 wherein the release of brown fumes from the reaction mixture into the air is minimized.

9. A method according to claim 1 wherein the reaction mixture and cellulose are agitated to prevent foam formation.

10. A method according to claim 1 wherein the water is added in an amount that is 5–10 times the volume of the volume of the phosphoric acid and the nitric acid.

11. A method according to claim 1 whereby the cellulose is soaked in the reaction mixture for a time period of about 12–48 hours.

12. A method according to claim 1 wherein the oxidized cellulose is first washed with water, then with a water-miscible organic solvent.

13. A method according to claim 12 wherein the oxidized cellulose is washed with water until it shows a pH of 5–7.

14. A method of preparing an aqueous dispersion of oxidized cellulose comprising: dissolving the oxidized cellulose prepared in accordance with claim 1 in an alkali solution to form an alkali solution; and reducing the pH of the alkali solution with an acid.

15. A method according to claim 14 wherein the pH of the alkali solution is reduced to a range of between about 1.0–3.5.

16. Oxidized cellulose; said oxidized cellulose having a degree of polymenzation of 82 or less, and a degree of crystallinity of 38% or less.

17. A pharmaceutical comprising: a drug; and oxidized cellulose; said oxidized cellulose having a degree of polymerization of 82 or less, and a degree of crystallinity of 38% or less.

18. A pharmaceutical according to claim 17 whereby the drug is contained in microspheres incorporating the oxidized cellulose.

19. A pharmaceutical according to claim 18 further including a plasticizer.

20. A pharmaceutical according to claim 17 wherein the drug is placed in a free film incorporating the oxidized cellulose.

21. A pharmaceutical according to claim 18 which is a transdermal or topical dosage form.

* * * * *

UNITED STATES PATENT AND TRADEMARK OFFICE
CERTIFICATE OF CORRECTION

PATENT NO.    : 6,627,749 B1
DATED         : September 30, 2003
INVENTOR(S)   : Vijay Kumar It is certified that error appears in the above-identified patent and that said Letters Patent is hereby corrected as shown below:

Column 1,
Line 26, should read -- $\geq 3\%$ --

Column 2,
Line 3, should read -- *in-vivo* --

Column 3,
Line 21, should read -- $HNO_3$. --
Line 43, should read -- α-cellulose --

Column 6,
Line 26, should read -- $\geq 3\%$ --

Column 18,
Line 37, should read -- without 0.5% --

Signed and Sealed this

Eleventh Day of November, 2003

JAMES E. ROGAN
*Director of the United States Patent and Trademark Office*